United States Patent
Ferreira et al.

(10) Patent No.: US 12,436,746 B2
(45) Date of Patent: Oct. 7, 2025

(54) METHOD AND SYSTEM FOR HOSTING THIRD-PARTY WEB WIDGETS FOR APPLICATION DEVELOPMENT

(71) Applicant: PALANTIR TECHNOLOGIES INC., Denver, CO (US)

(72) Inventors: Francisco Ferreira, Uitikon Waldegg (CH); Matthieu Beteille, Brooklyn, NY (US); Oluwasesanfunmi Takuro, London (GB); Pierre-Victor Claude Georges Chaumier, Paris (FR); Raj Krishnan, London (GB); Rongxing Sun, Santa Clara, CA (US); Timothy Leung, London (GB)

(73) Assignee: Palantir Technologies Inc., Denver, CO (US)

( * ) Notice: Subject to any disclaimer, the term of this patent is extended or adjusted under 35 U.S.C. 154(b) by 155 days.

(21) Appl. No.: 18/209,438

(22) Filed: Jun. 13, 2023

(65) Prior Publication Data
US 2024/0231766 A1 Jul. 11, 2024

Related U.S. Application Data

(60) Provisional application No. 63/438,209, filed on Jan. 10, 2023.

(51) Int. Cl.
*G06F 8/34* (2018.01)
*G06F 8/36* (2018.01)
(Continued)

(52) U.S. Cl.
CPC .................. *G06F 8/38* (2013.01); *G06F 8/34* (2013.01); *G06F 8/36* (2013.01); *G06F 11/3688* (2013.01);
(Continued)

(58) Field of Classification Search
CPC ..... G06Q 30/0255; G06F 40/177; G06F 8/34; G06F 8/36; G06F 8/71; G06F 8/38;
(Continued)

(56) References Cited

U.S. PATENT DOCUMENTS

| | | | |
|---|---|---|---|
| 2006/0005207 A1* | 1/2006 | Louch | G06F 8/38 717/100 |
| 2010/0023874 A1* | 1/2010 | Frohwein | G06Q 30/0255 715/747 |

(Continued)

OTHER PUBLICATIONS

JP 3624447 (translation), Mar. 2, 2005, 11 pgs <JP_3624447.pdf>.*
Extended European Search Report dated Jun. 4, 2024, issued in related European Patent Application No. 24150039.6 (10 pages).

*Primary Examiner* — Tuan A Vu
(74) *Attorney, Agent, or Firm* — Sheppard Mullin Richter & Hampton LLP

(57) ABSTRACT

This disclosure describes a computing system and method that allows developing and hosting third party widgets for building web or mobile applications. An exemplary method includes receiving, within a sandbox environment, source code for generating a widget and generating a live preview of the widget based on the source code; receiving a publishing command to publish the widget and executing an automatic pipeline to run tests on the widget; publishing the widget to a repository that is accessible through a no-code application builder; receiving, from the no-code application builder, a request to integrate the widget into an application; generating a configuration user interface for customizing the widget; and integrating the customized widget into an application by at least loading an ontology data corresponding to the application into the widget.

18 Claims, 10 Drawing Sheets

(51) Int. Cl.
  *G06F 8/38*    (2018.01)
  *G06F 11/3668*    (2025.01)
  *G06F 3/04817*    (2022.01)
  *G06F 8/41*    (2018.01)
  *G06F 9/54*    (2006.01)
  *G06F 16/25*    (2019.01)
  *G06F 21/12*    (2013.01)
  *G06F 21/36*    (2013.01)

(52) U.S. Cl.
  CPC .......... *G06F 3/04817* (2013.01); *G06F 8/447* (2013.01); *G06F 9/54* (2013.01); *G06F 16/252* (2019.01); *G06F 21/128* (2013.01); *G06F 21/36* (2013.01)

(58) Field of Classification Search
  CPC ...... G06F 9/54; G06F 16/252; G06F 11/3688; H04L 67/02
  See application file for complete search history.

(56) References Cited

U.S. PATENT DOCUMENTS

| | | |
|---|---|---|
| 2012/0137227 A1 | 5/2012 | Gerken et al. |
| 2012/0208564 A1* | 8/2012 | Clark ................ H04W 4/02 455/456.3 |
| 2013/0151417 A1 | 6/2013 | Gupta |
| 2014/0095382 A1 | 4/2014 | Desai et al. |
| 2019/0245910 A1* | 8/2019 | Abrahami ............ G06F 16/252 |
| 2020/0050787 A1* | 2/2020 | Mahalle ................ G06F 9/54 |
| 2020/0133982 A1* | 4/2020 | Thangeswaran ........ H04L 67/02 |
| 2021/0157978 A1* | 5/2021 | Haramati ............ G06F 40/177 |

\* cited by examiner

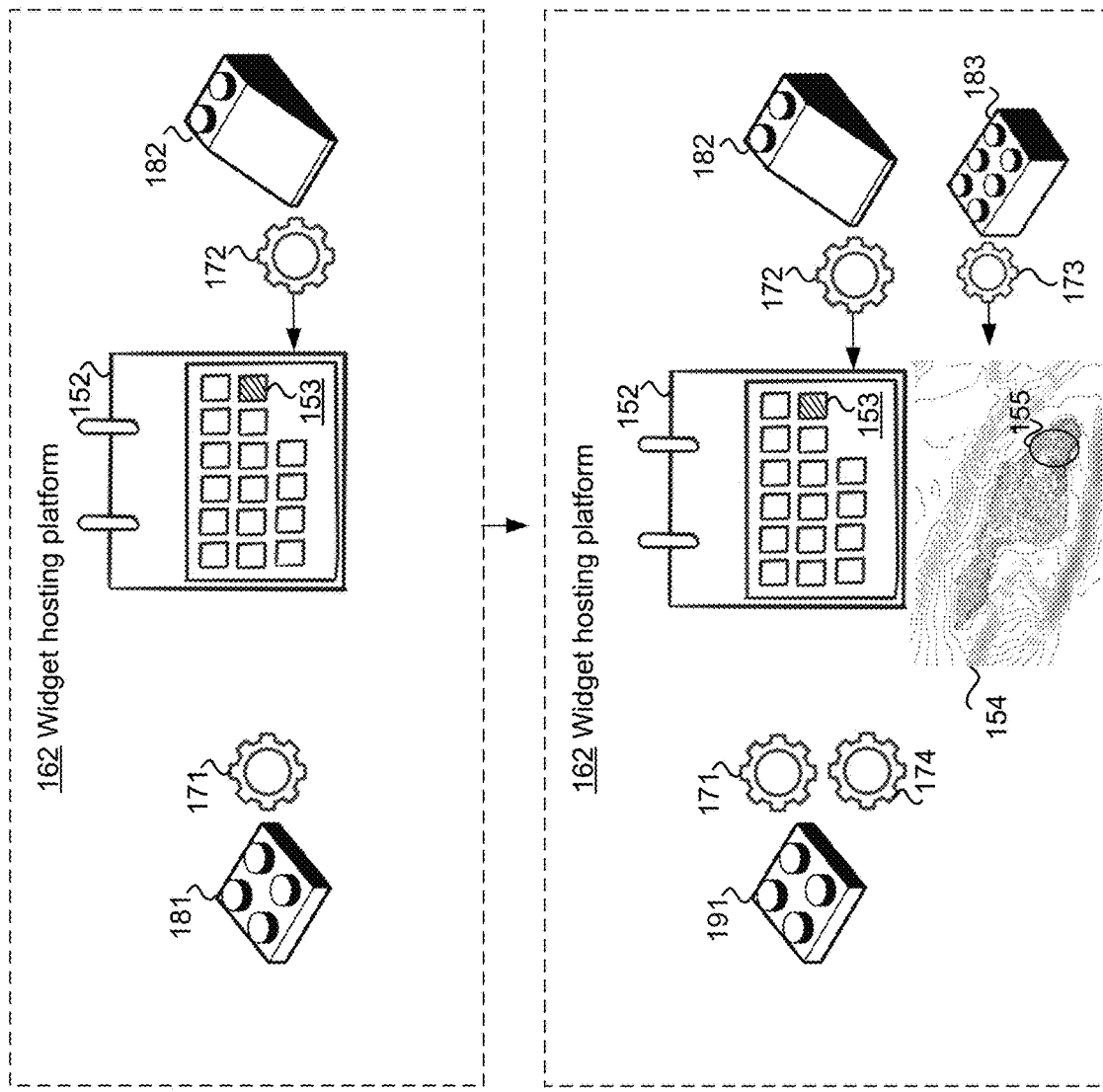

| Person | SSN |
|---|---|
| A | *--**** |
| B | *--**** |
| C | *--**** |

| Person | SSN |
|---|---|
| A | ******** |
| B | ******** |
| C | ******** |

| Person | Address |
|---|---|
| A | ********** |
| B | ********** |
| C | ********** |

FIG. 4B

METHOD AND SYSTEM FOR HOSTING THIRD-PARTY WEB WIDGETS FOR APPLICATION DEVELOPMENT

CROSS REFERENCE TO RELATED APPLICATION

This application claims the benefit under 35 U.S.C. 119(e) of U.S. Provisional Application No. 63/438,209, filed Jan. 10, 2023, the content of which is hereby incorporated in its entirety.

FIELD OF THE INVENTION

This disclosure relates to approaches for managing the development and deployment of third-party widgets for building web applications.

BACKGROUND

WYSIWYG (what you see is what you get) application builder allows less-technical application developers to create high-quality operational apps in minutes without writing codes or writing only a limited amount of code or logic. These applications are built on a system of widgets that interact with each other to provide the desired functionalities. In the mainstream platforms, these widgets, acting as the building blocks for the web or mobile applications, are generally first-party widgets provided (e.g., developed and packaged) by the WYSIWYG application builder or by the hosting services. By exclusively hosting the first-party widgets, these systems have good control over the quality assurance, access management, and security checks of the widgets and the resulting applications.

On the other hand, allowing customized widgets developed by third-party developers would provide more flexibility to the application builders. In the long run, a system allowing third-party widgets is able to harvest the resources from third-party communities and has a greater chance of growth.

However, third-party widgets may bring various challenges to the hosting platforms, such as security vetting, access control, version management, etc. This disclosure describes a system that enables the development of third-party widgets with live preview, manages the third-party widgets, and allows application builders to access third-party widgets.

SUMMARY

Various embodiments of the present disclosure can include computing systems, methods, and non-transitory computer-readable media.

In some aspects, the techniques described herein relate to a system including: one or more processors; and a memory storing instructions that, when executed by the one or more processors, cause the system to perform, within a platform in a sandbox environment: receiving, within the sandbox environment, source code for generating a widget; generating, within the sandbox environment, a live preview of the widget based on the source code; receiving a publishing command to publish the widget; executing an automatic pipeline to run tests on the widget; publishing the widget to a repository that is accessible through a no-code application builder; receiving, from the no-code application builder, a request to integrate the widget into an application; generating a configuration user interface for customizing the widget; and integrating the customized widget into an application by at least loading an ontology data corresponding to the application into the widget.

In some aspects, the platform further includes a web browser, and the source code and the publishing command are received by the web browser, the live preview is displayed on the web browser, and the configuration user interface for customizing the widget is displayed on the no-code application builder.

In some aspects, the web browser includes a first region for receiving the source code, and a second region for displaying the live preview of the widget.

In some aspects, to generate the live preview, the instructions cause the system to further perform: syncing the source code into an in-browser bundler with pre-loaded libraries, wherein the in-browser bundler includes a dependency graph indicating relationships between the source code and the pre-loaded libraries; and rendering, using the in-browser bundler, the preview of the widget based on the source code and libraries used by the source code, wherein the rendering includes at least running a main entry point of the widget inside an iframe.

In some aspects, the system is associated with or includes one or more machine learning components. To publish the widget to the repository, the instructions cause the system to further perform: obtaining, using the one or more machine learning components, metadata of the widget; obtaining a list of repositories; for each of a plurality of repositories, determining whether metadata of the repository matches with the metadata of the widget; and in response to the metadata of the repository matching with the metadata of the widget, publishing the widget to the repository. In some examples, the one or more machine learning components may perform other functions.

In some aspects, the no-code application builder includes a graphic user interface (GUI) to generate the request without writing code.

In some aspects, to executing the automatic pipeline to run tests on the widget, the instructions cause the system to further perform: integrating the widget with one or more preexisting widgets, wherein the integrating includes importing ontology data corresponding to the platform into the widget and the one or more preexisting widgets, wherein the integrating results in a creation of a test application; feeding input data into the test application; executing the test application to output data based on the input data; and receiving a verification of the test application.

In some aspects, the widget and the one or more preexisting widgets are published under different categories.

In some aspects, after generating the configuration user interface for customizing the widget, the instructions cause the system to further perform: receiving an input from the configuration user interface that identifies the ontology data corresponding to the application.

In some aspects, the configuration user interface for customizing the widget allows a user to configure a shape of the widget.

In some aspects, the instructions cause the system to further perform: receiving source code for generating a new version of the widget; and publishing the new version of the widget to the repository that is accessible through the no-code application builder while keeping older versions of the widget.

In some aspects, the instructions cause the system to further perform: receiving, through the no-code application builder, a request to upgrade an already integrated version of the widget to the new version of the widget; and integrating the new version of the widget into the application.

In some aspects, the instructions cause the system to further perform: receiving, through the no-code application builder, a request to downgrade an already integrated version of the widget to an older version of the widget; and integrating the older version of the widget into the application.

In some aspects, to generate the live preview of the widget based on the source code, the instructions cause the system to further perform: performing live code syntax analysis while the source code is being received; and in response to detecting that an atomic section of the source code is received based on the live code syntax analysis, updating, in real-time, an rendering of the live preview by incorporating features implemented by the atomic section of the source code.

In some aspects, the techniques described herein relate to a computer-implemented method, including: receiving, within a sandbox environment, source code for generating a widget; generating, within the sandbox environment, a live preview of the widget based on the source code; receiving a publishing command to publish the widget; executing an automatic pipeline to run tests on the widget; publishing the widget to a repository that is accessible through a no-code application builder; receiving, from the no-code application builder, a request to integrate the widget into an application; generating a configuration user interface for customizing the widget; and integrating the customized widget into an application by at least loading an ontology data corresponding to the application into the widget.

In some aspects, the techniques described herein relate to a non-transitory computer-readable storage medium configured with instructions executable by one or more processors to cause the one or more processors to perform operations including: receiving, within a sandbox environment, source code for generating a widget; generating, within the sandbox environment, a live preview of the widget based on the source code; receiving a publishing command to publish the widget; executing an automatic pipeline to run tests on the widget; publishing the widget to a repository that is accessible through a no-code application builder; receiving, from the no-code application builder, a request to integrate the widget into an application; generating a configuration user interface for customizing the widget; and integrating the customized widget into an application by at least loading an ontology data corresponding to the application into the widget.

These and other features of the computing systems, methods, and non-transitory computer readable media disclosed herein, as well as the methods of operation and functions of the related elements of structure and the combination of parts and economics of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 1C illustrates an example upgrade in a widget, in accordance with various embodiments.

FIG. 4B illustrates an example live preview, in accordance with various embodiments.

DETAILED DESCRIPTION

Figure 1A:
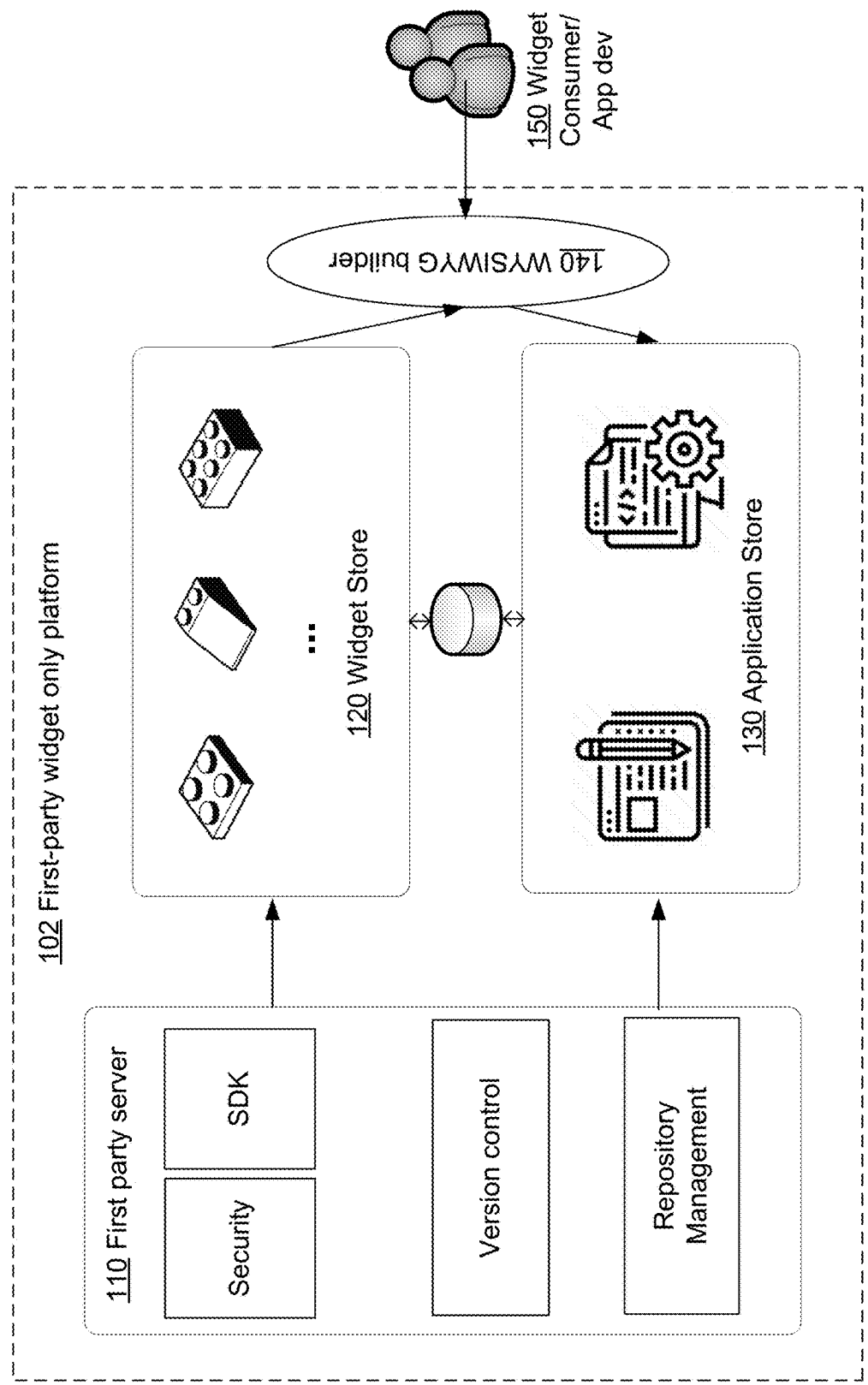
FIG. 1A illustrates an example system diagram for building applications in a no-code environment using first-party widgets, in accordance with various embodiments.

When developing web or mobile applications, no-code application builders allow less-technical consumers to compose the applications using provided widgets without writing substantial amount of code. These widgets may be considered as the basic elements or building blocks of the web or mobile applications. FIG. 1A illustrates a first-party widget-only platform 102 that only hosts first-party widgets for building applications in a no-code environment, in accordance with various embodiments. First-party widgets here refer to the widgets developed internally by the platform 102 using various native services. These widgets may be developed using the internal software development kit (SDK) and the corresponding application programming interfaces (APIs) provided by a first party server 110. These widgets must pass the security checks (e.g., running security verification checks) before being published for the consumption of application builders 150. The security checks may include automatic analysis of the code based on previous patterns of code from a same source (e.g., the widget).

In some embodiments, the first party server 110 may also include version control tools to manage version changes of the widgets. For instance, the version control tools may allow the consumers to upgrade to a newer version of a widget through an automatic or manual approach, downgrade to an older version of the widget when the new version is buggy or incompatible with other widgets, etc.

In some embodiments, the first-party server 110 may further provide repository management over the deliverables and artifacts of the system. The deliverables may include the binary packages of the widgets and the applications built over the widgets, and the artifacts may include any documentation or metadata of the deliverables describing the function, architecture, and/or design of the deliverables. Source code, meeting notes, workflow diagrams, data models, risk assessments, use cases, prototypes, and compiled applications may be considered artifacts. The repository management may include automatic tools to manage user and group permissions (e.g., access control or access parameters), perform folder functions, provide a navigator with a graphic user interface for users to browse or search for widgets or applications, manage the visibility of particular widgets to different application development projects, etc.

In some embodiments, the widgets (e.g., the first-party widgets) may be stored in a widget store 120. The widget consumer, i.e., the application developer 150 may access the widget store 120 through a WYSIWYG builder (e.g., a GUI-based IDE). The "access" may include browsing the widget available to the application building project, searching for widgets satisfying specific conditions (e.g., with specific functionalities or being developed by a certain group), etc. The application developer 150 may drag and drop the desired widgets, configure the widgets (e.g., specifying input parameters of the widgets), and connect the widgets or otherwise substantiate the interaction among the widgets (e.g., one widget's output is fed into another widget as input), etc. Finally, the group of widgets may be collectively compiled or packaged into a deliverable, i.e., an application. The composed applications may be stored in an application store 130 with version controls and repository management. In some embodiments, both the widget store 120 and the application store 130 are maintained in one or more database systems.

Figure 1B:
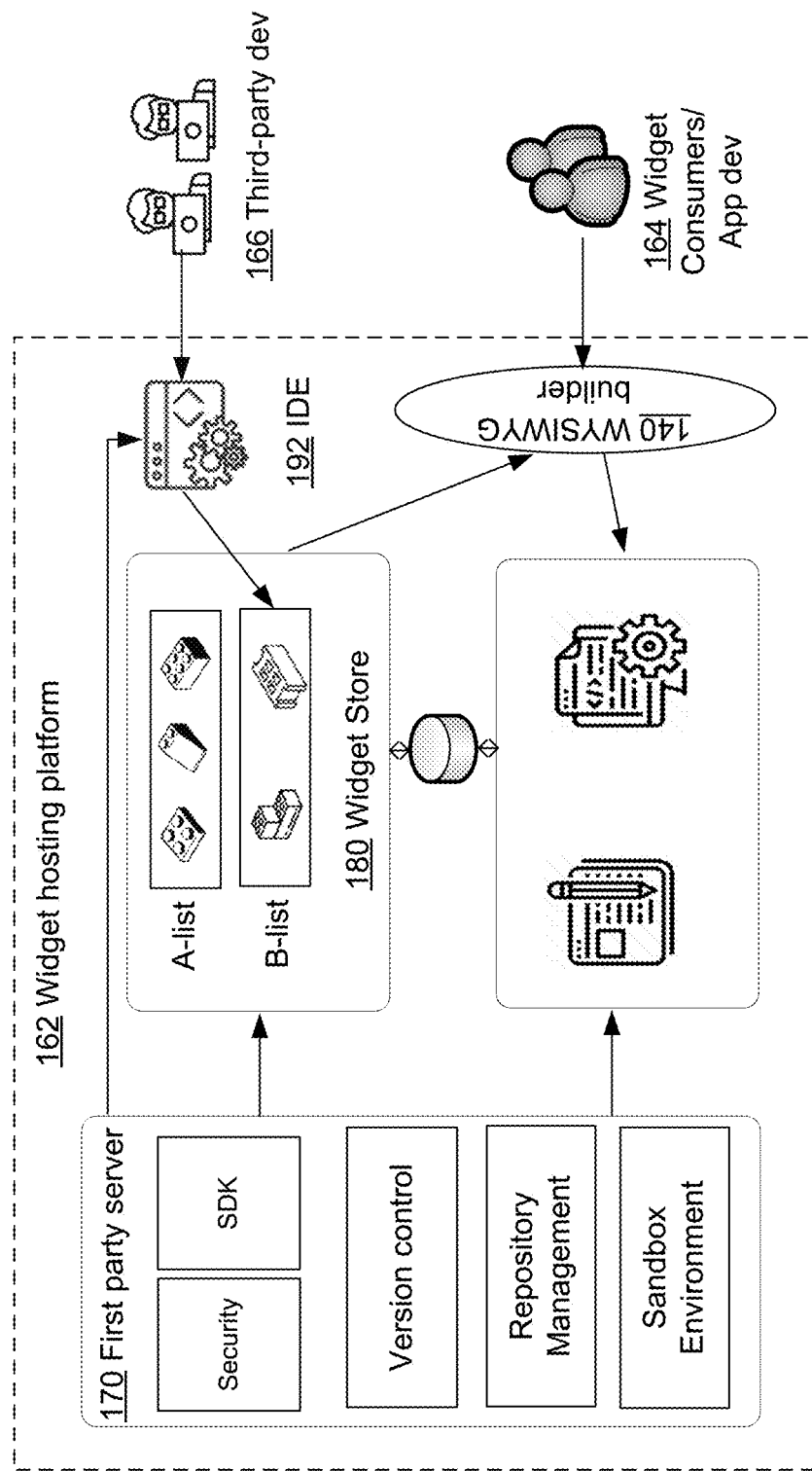
FIG. 1B illustrates an example system diagram of building applications in a no-code environment using first-party and third-party widgets, in accordance with various embodiments.

FIG. 1B illustrates an example widget hosting platform 162 of building applications in a no-code environment using first-party and third-party widgets, in accordance with various embodiments. In comparison with the first-party widget-only platform 102 in FIG. 1A, the widget hosting platform 162 in FIG. 1B allows third-party developers 166 to develop and publish third-party widgets through an IDE 192. This way, the widget consumers or application developers 164 may have access to both the organic widgets (first-party widgets provided by the platform 162) and the third-party widgets.

In some embodiments, the IDE 192 exposed to third-party developers 166 may include the SDK and APIs provided by the platform 162. The SDK and APIs allow the third-party developers 166 to access libraries that are used to be only accessible to in-house developers. In some embodiments, the SDK and APIs exposed to the third-party developers 166 may be a trimmed or condensed version so that the security-critical libraries (e.g., system calls, certain memory management calls, user data access calls) may be protected from malicious widgets.

In some embodiments, the IDE 192 may be a web-browser IDE that supports live previews of the widgets being developed. For instance, the IDE 192 may include a code editing region and a widget live preview region. The code editing region may keep receiving source code input by the third-party developer 166 for constructing a widget. The IDE 192 may include a code tracker that tracks the source code being received. Based on syntax analysis of the source code, the code tracker may determine an atomic function block has been received, and then trigger a compiler to compile the existing source code and generate a live preview of the current version of the widget. The code tracker may include a set of syntax analyzers and lexical analyzers targeting different programming languages.

Figure 4A:
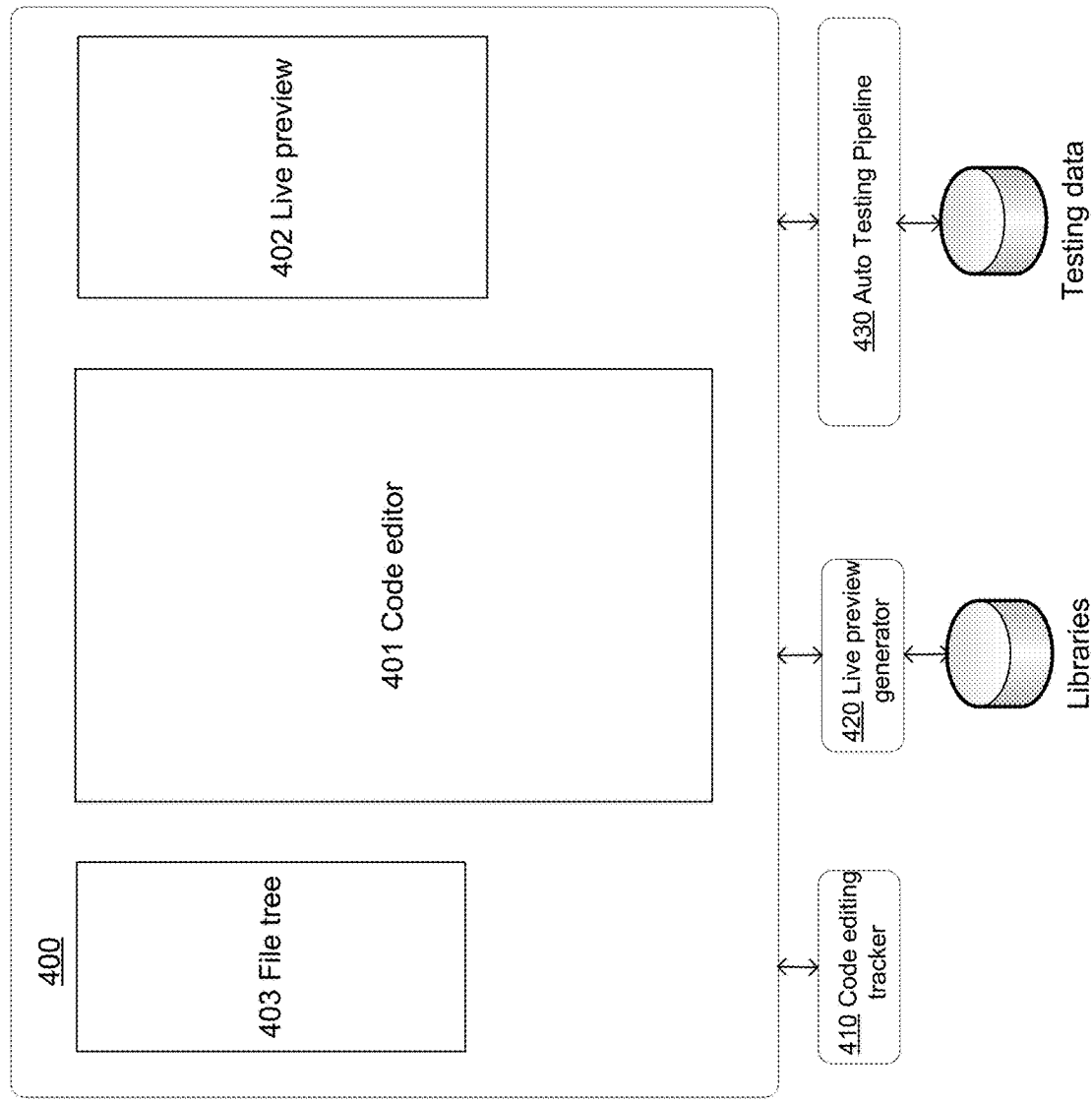
FIG. 4A illustrates an example system diagram for developing and publishing third-party widgets, in accordance with various embodiments.

In some embodiments, the code tracker may be disabled when the code editing region is actively receiving source code (e.g., the developer is typing the source code), and enabled when there is no action detected in the code editing region for a predetermined temporal threshold (e.g., 5 seconds). After being enabled, the code tracker may perform syntax analysis to determine if there is any incomplete code block (or whether the most recently edited code block is an atomic function block). If so, the live preview of the current version of the source code may be displayed in the preview region. The live preview function allows the developer to detect mistakes and make timely corrections. In some examples, the live preview may illustrate how the current version would appear across different platforms or stacks, for example, which may have different ontologies. An example IDE 192 is illustrated in FIG. 4A.

Figure 2A:
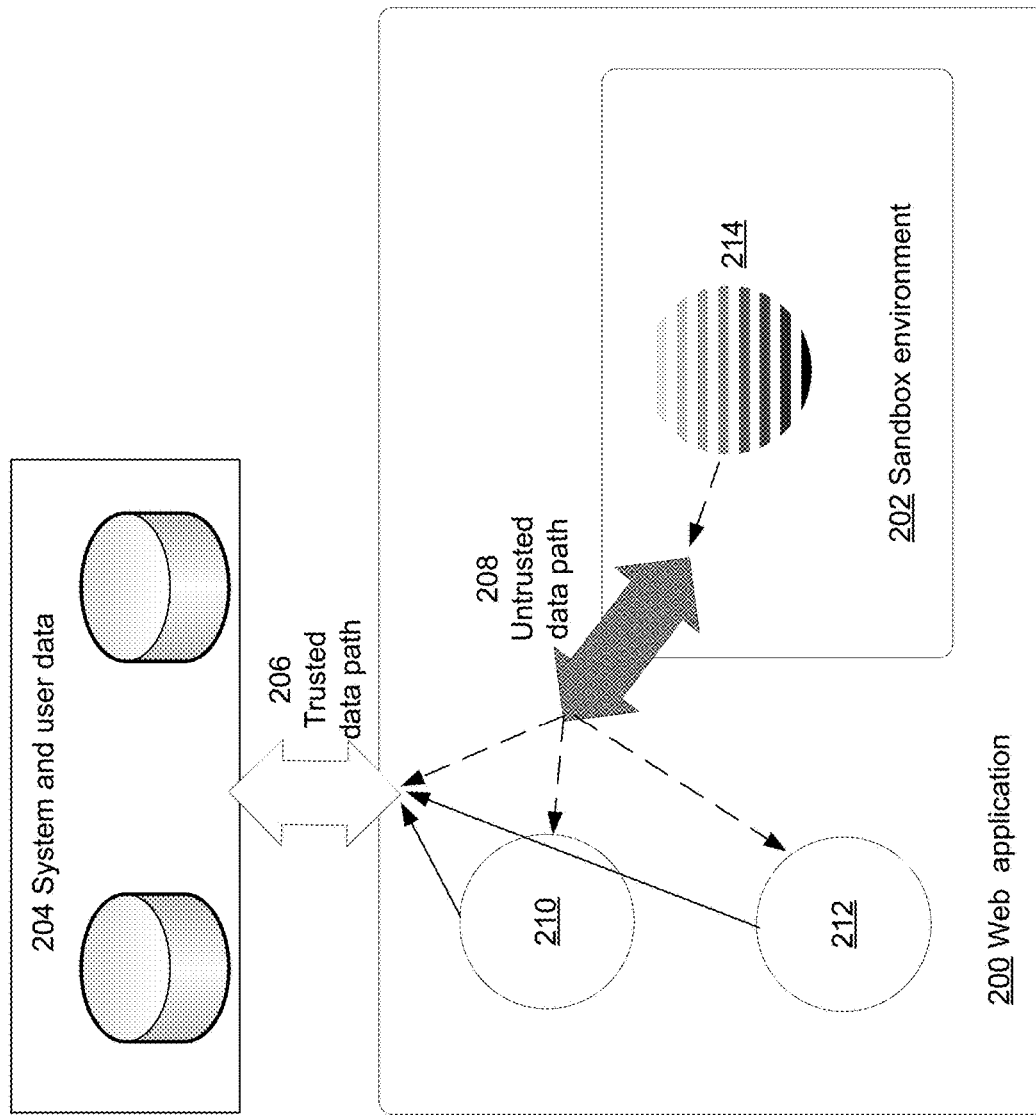
FIG. 2A illustrates an example widget interaction control for hosting third-party widgets for application development, in accordance with various embodiments.
Figure 2B:
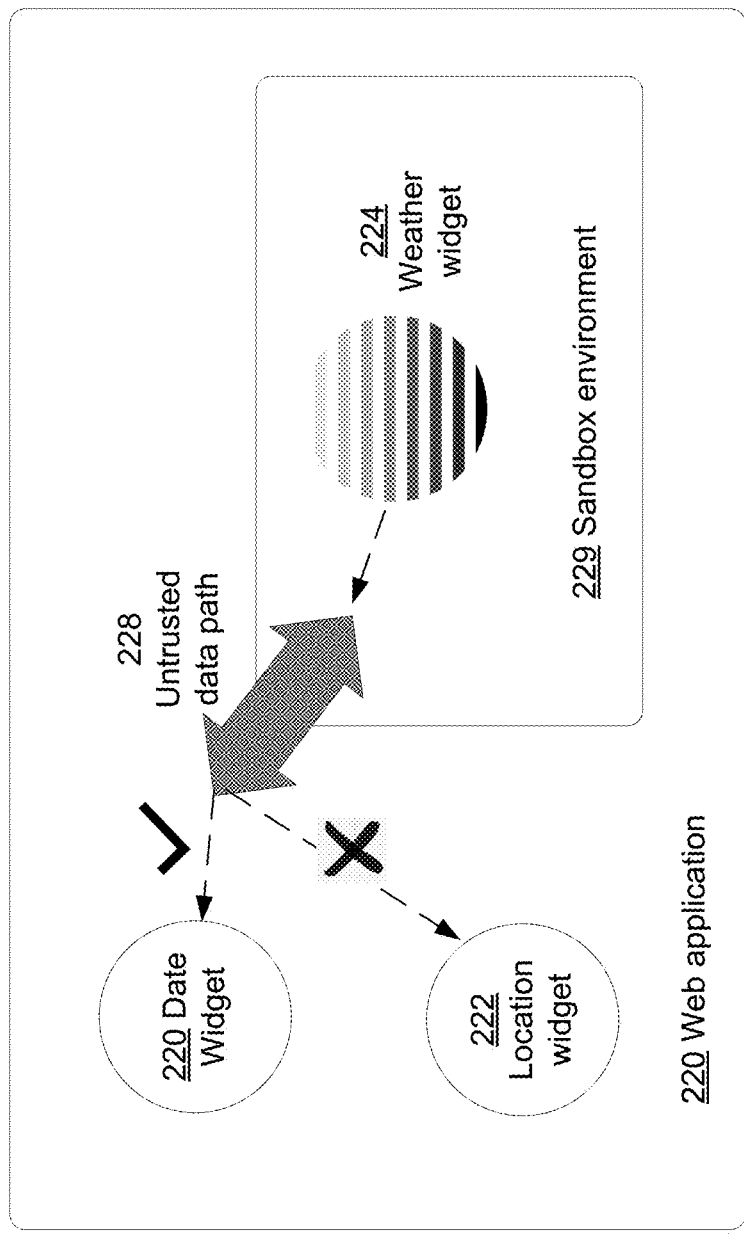
FIG. 2B illustrates an example access control mechanism for hosting third-party widgets for application development, in accordance with various embodiments.

In some embodiments, considering the third-party widgets are generally less trustworthy in comparison to the first-party widgets, the widget store 180 may include separate sub-stores or lists (e.g., A-list and B-list) for separating the first-party and third-party widgets. For instance, a first-party widget stored in an A-list may execute all its functions and APIs without run-time restrictions. However, a third-party widget stored in a B-list may be executed in a sandbox environment only. The sandbox environment may refer to an isolated virtual machine or virtual domain in which potentially unsafe software code may execute without affecting other critical resources or local applications. The third-party widget executed in the sandbox environment may have restricted access to system libraries and user data, limited communication channels with other widgets, etc. Some examples of the sandbox environment are illustrated in FIGS. 2A and 2B.

An example workflow in the widget hosting platform may start with receiving, within the sandbox environment, source code from a third-party developer for building a third-party widget. Limiting the coding environment to the sandbox reduces the chances of malicious data access or system attacks. The code tracker may perform live code tracking and generate a live preview of the widget by incorporating features implemented by the most recent atomic unit of the source code. Once the developer is satisfied with the widget, a publishing command may be issued to publish the widget to the platform 162. The publishing command may trigger one or more testing pipelines to run tests and verifications on the widget.

The pipelines may automatically run test programs against the widget and make sure the widget does not cause a crash in various preconfigured use cases. For example, as part of the testing process, the widget may be integrated with one or more preexisting widgets (e.g., the widget and the one or more preexisting widgets may be from different categories) to form a testable unit or testable application. Here, the integrating may include importing ontology data corresponding to the platform 162 into the widget and the one or more preexisting widgets. Then testing data may be fed into the testable unit for execution and generating output data. The output data may be further verified. In some embodiments, integrating the widget with a buggy widget in the testable application may result in a false negative test result. To avoid false negatives, the other widgets in the testable applications may be from a different or more trustworthy widget repository, e.g., the first-party widgets.

In some embodiments, the pipelines may also monitor the memory footprint and processing power consumption of the widget. If the widget consumes too much (e.g., beyond corresponding thresholds of) memories and/or processing powers (e.g., forking too many threads), the platform may abort the publishing of the widget. If the widget passes the testing pipelines, the metadata of the widget may be obtained and compared against the metadata of a plurality of widget repositories (e.g., the lists in the widget store 180). If the metadata of the widget matches with one or more of the widget repositories, the widget may be published therein.

Once the widget is published, it may be available for a widget consumer 164 (application developer) through a no-code application builder 140 (e.g., through a GUI). Subsequently, the platform 162 may receive a request to integrate the widget into an application when the widget consumer 164 selects and drops the widget in the no-code application builder 140. The platform 162 may then generate a user interface for the widget consumer 164 to customize the widget on the no-code application builder 140. The customization may include adjusting the appearance of the widget (e.g., shape, color, size, theme) as well as the functions of the widget. For instance, the widget consumer 164 may specify, or the widget may be programmed according to, one or more input parameters required or permitted by the widget to implement the desired function, and/or other applications that the widget is permitted to interact with, and a mechanism for such interactions (e.g., via application programming interfaces (APIs)). The required or permitted parameters may be imported or ingested from another source, such as another application. For example, the platform 162 may call an application programming interface (API), which connects to an external application (e.g., outside of the platform 162) or another widget, to obtain an output from the external application or the another widget, which is in turn inputted as a required or permitted parameter to the widget. In some embodiments, the input parameters may be incorporated as part of an ontology, and/or result in the widget loading a specific ontology data corresponding to the application. The input parameters may encompass attributes of objects within the ontology, for example. The ontology data may refer to an ontology data model applied to a set of row data to create a knowledge graph—a collection of entities, where the types and the relationships between them are expressed by nodes and edges between these nodes.

In some embodiments, the widget hosting platform 162 includes a first-party server 170 to provide the above-described services, such as security checks, SDK, version control, repository management, and a sandbox environment. For instance, the version control may allow the third-party developer 166 to generate a new version of a previously built widget, and publish the new version while keeping the old version. In some embodiments, the version control may allow the widget consumer 164 to send a request to upgrade an already integrated version of the widget, which integrates the new version into the application. In some embodiments, the version control may also allow the widget consumer 164 to downgrade an already integrated widget to an older version, for example, if the new version introduces breaking changes.

For example, an upgrade to a widget may encompass modifying a shape of the widget. In the modified shape, required or permitted parameters may change, be added, or be removed. Originally, for example, a permitted parameter may include a date or date range over which certain information is displayed. Following the upgrade, an additional required or permitted parameter may include a geolocation, geospatial window, or geofence over which that information is displayed. The platform 162 may activate or create a new API, if no API connection already exists, that may connect to a different external application or different widget, such as a map application or a map widget, which outputs such a required or permitted parameter. Alternatively, the platform 162 may call an existing API, if one already exists, to obtain a connection, and the outputted parameter, from the external application or the different widget. For example, in the external application or the different widget, a geolocation or geospatial window may be selected either manually or automatically. The new API or the existing API may detect such a selection and/or obtain or retrieve such a required or permitted parameter and feed or ingest that required or permitted parameter into the widget. In such a manner, the widget may automatically be upgraded.

FIG. 1C illustrates an example upgrade to a widget. A widget 181 may be programmed to receive required or permitted parameters or attributes (hereinafter "parameters"). The widget 181 may obtain such required or permitted parameters from a different widget or a different application which may be outside the platform 162. Here, the widget may obtain a parameter from a widget 182 within the platform 162. The platform 162 may call an API between the widget 181 and the widget 182. The API may have API endpoints 171 and 172 at the widget 181 and the widget 182, respectively. Here, the widget 182 may include a calendar 152, in which a date or date range or other temporal attribute may be selected. The widget 181 may obtain a selected date 153 as a required or permitted parameter, via the connection between the API endpoints 171 and 172.

In FIG. 1C, the widget 181 may be updated to an updated widget 191. The updated widget 191 may have modified its required or permitted parameters compared to the widget 181. For example, the updated widget 191 may have an additional required or permitted parameter of a geolocation. The updated widget 191 may obtain such an additional required or permitted parameter from a different widget or a different application which may be outside the platform 162. Here, the updated widget 191 may obtain a parameter from a widget 183 within the platform 162. The platform 162 may call an API between the updated widget 191 and the widget 183. The API may have endpoints 174 and 173 at the updated widget 191 and the widget 183, respectively. Here, the widget 183 may include a map 154, in which geospatial location, window, or other attribute may be selected. The updated widget 191 may obtain a selected geospatial region 155 as a required or permitted parameter, via the connection between the API endpoints 174 and 173. Therefore, the platform 162 may adapt to updates in widgets by calling additional functions or features such as APIs.

FIG. 2A illustrates an example widget interaction control for hosting third-party widgets for application development, in accordance with various embodiments. The workflow illustrated in FIG. 2A is an example and does not limit the scope of this disclosure.

In FIG. 2A, a third-party widget 214 is integrated with two first-party widgets 210 and 212 into a web application 200. While the first-party widgets 210 enjoy a trusted data path 206 to access system and user data 204, the third-party widget 214 is running in a sandbox environment 202 that has an untrusted data path 208 to the outside world. Through the untrusted data path 208, the third-party widget 214 may interact with the first-party widgets 210 and 212 and the system and user data 204. In some embodiments, the untrusted data path 208 works as a filter that blocks certain calls initiated from the third-party widget 214. For example, the memory addressing commands initiated from the third-party widget 214 may be limited to a certain range of the memory (e.g., cannot access critical system services or sensitive user data).

FIG. 2B illustrates an example access control mechanism for hosting third-party widgets for application development, in accordance with various embodiments. The scenario illustrated in FIG. 2B is a specific example corresponding to FIG. 2A.

As shown, the third-party widget, i.e., a weather widget 224, is integrated with two first-party widgets, i.e., a date widget 220 and a location widget 222, in a web application 220. The date widget 220 may obtain a system date and time, and the location widget 222 may obtain the current location of the system (e.g., a laptop, a server, a smartphone, or a tablet). The weather widget 222 is running in a sandbox environment 229 and interacts with the date widget 220 and the location widget 222 through an untrusted data path 228. In some embodiments, the untrusted data path 228 may allow the weather widget 224 to request for output from the date widget 220 to obtain the current date and time, but reject the request for a current location of the system from the location widget 222. Without the information from the location widget 222, the weather widget 224 may display the weather information of the current time for a pre-configured location (e.g., the location customized by a widget consumer when integrating the widget 224 into the application 220).

In some embodiments, the untrusted data path 228 may be adjusted based on the application user's request. For instance, if the user of the application 220 determines that the weather widget 224 is harmless, he/she may grant the weather widget 224 access to the location widget 222 so that it can display the weather information for the current date/time and the current location of the system running the application 220.

Figure 3:
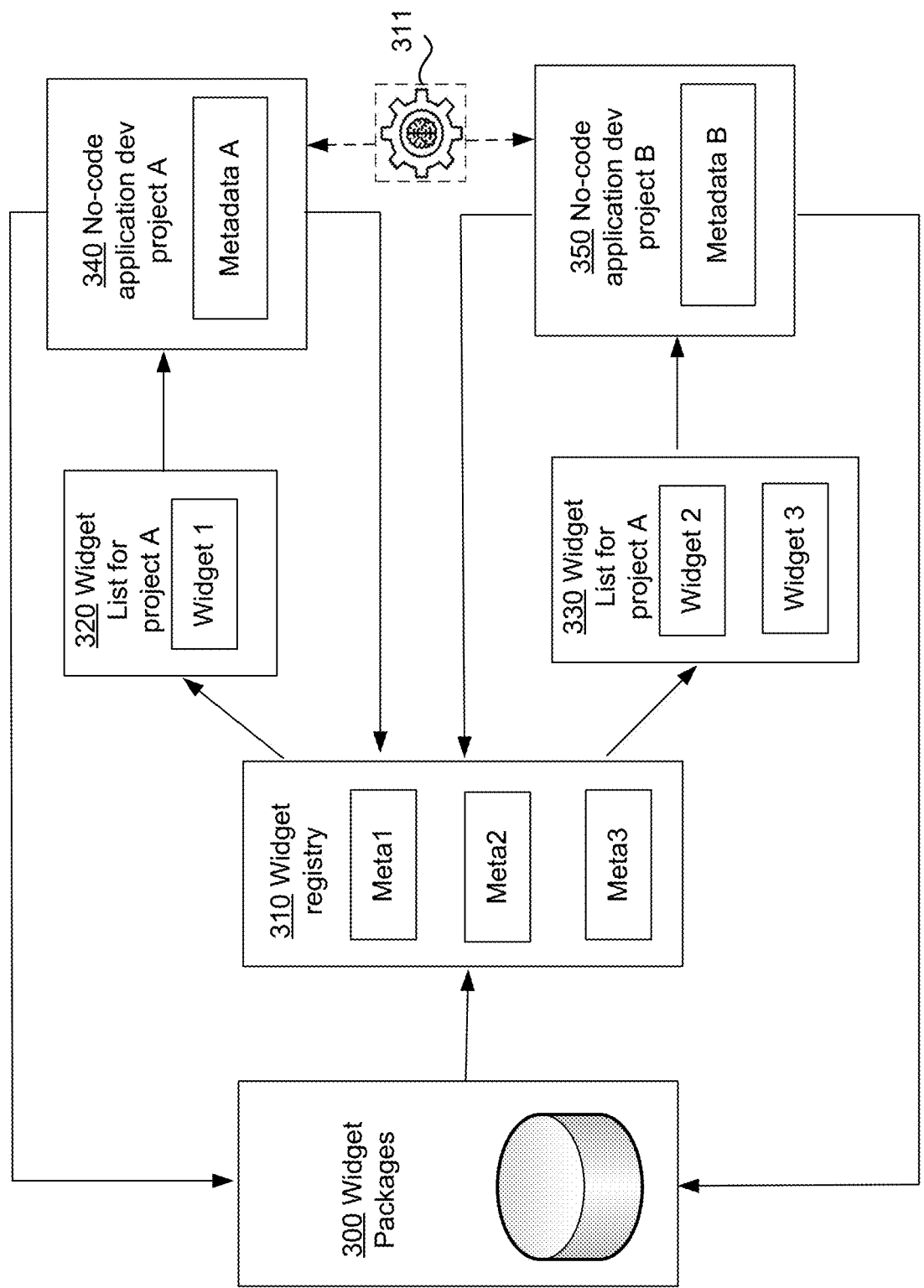
FIG. 3 illustrates an example diagram for managing visibility of third-party widgets for application development projects, in accordance with various embodiments.

FIG. 3 illustrates an example diagram for managing the visibility of third-party widgets for application development projects, in accordance with various embodiments. To provide a better user experience, third-party widgets may be selectively published for different application development projects. This way, the application builder may only be exposed to the third-party widgets that are relevant to his/her project.

As shown in FIG. 3, third-party widget packages 300 may be stored in a database system and registered in a widget registry 310. In particular, a widget's actual package may be stored in the database system, and its metadata may be registered in the widget registry 310. Storing the package and its metadata separately provides efficient data storage and lookups. By only keeping the metadata of the widgets, the widget registry 310 is small in storage footprint and easier to fit in memory for quick lookups.

When a builder creates a no-code application dev project (e.g., project A 340 and project B 350 in FIG. 3), metadata of the project may be received (e.g., metadata A for project A and metadata B for project B in FIG. 3). The metadata of the projects may include the projected use cases of the applications being developed (e.g., chat app, social media, a webpage with video, map, image components).

In some embodiments, the metadata of the projects may be compared against the metadata in the widget registry 310 to locate the widget metadata that is relevant to the projects. For instance, a search operation based on metadata A of project A 340 may be performed against the widget registry 310 to locate the widget metadata with overlapping keywords. These located widget metadata may correspond to the widgets that are relevant to project A 340. Accordingly, the widget list for project A 320 may only include the widgets relevant to project A 340, and the widget list for project B 330 may only include the widgets relevant to project B 350. Once the builder of a project selects one widget from the corresponding widget list, the no-code builder may fetch the widget package from the widget package database system 300 for integration.

In some examples, a determination or inference of particular metadata, or a particular metadata category, type, and/or classification, relevant to the projects may be performed by one or more machine learning components 311, which may include a large language model (LLM). Any of the other functions described may also be associated with or performed at least in part by one or more machine learning components such as an LLM. For example, here, the machine learning components 311 may infer or suggest one or more of the particular relevant metadata, such as, one or more of the particular relevant metadata that is most likely to be relevant or applicable to a project. The inference of particular relevant metadata may be based on particular widgets present in a project (e.g., the project A 340 and/or the project B 350), particular called functions, most frequently called functions, and other components such as variables, parameters, arguments, events, and/or actions.

The training of the one or more machine learning components 311 may be iterative, and encompass multiple stages or iterations. For example, a first stage or iteration may train the machine learning components 311 while a second stage may include examples or a corpus of training data corresponding to examples or situations in which the machine learning components 311 had highest uncertainty rates or error rates, and/or in which the machine learning components 311 made incorrect inferences. Additionally, if any inferences were outside of certain probability or confidence level thresholds, such as, for example, below 90 percent, or below 80 percent, then additional training may be conducted with respect to those situations on the machine learning components 311. Thus, subsequent iterations or stages of training may further improve or confirm outputs generated by the machine learning components 311.

An incorrect inference may refer to an incorrect inference of a particular metadata and may encompass a situation where, for example, a first particular metadata is most relevant for a project, but the machine learning components 311 either failed to identify the first particular metadata and/or identified a second particular metadata that in fact is not the most relevant for the project. An incorrect inference may include a false positive detection or a false negative detection. Thus, subsequent iterations or stages of training may further improve or confirm outputs, inferences, or predictions generated by the machine learning components 311.

FIG. 4A illustrates an example system diagram for developing and publishing third-party widgets, in accordance with various embodiments. The system diagram includes an integrated development environment (IDE), which may be a web browser (e.g., the IDE is web-based). As shown, the IDE 400 may include at least two regions, a code editor 401 and a live preview 402. Depending on the implementation, the IDE 300 may include more or alternative regions. For instance, the IDE 400 may further include a file tree 403 for easy navigation through the widget development project or integration with other widgets.

In the backend, the IDE 400 may be coupled with SDK and corresponding APIs and libraries, a code editing tracker 410, a live preview generator 420, and an auto-testing pipeline 430. In some embodiments, the code editing tracker 410 tracks the user input (e.g., source code implementing functionalities of a third-party widget) in the code editor 401 and determines whether an atomic function block has been received. The atomic function block refers to a piece of source code that has a complete syntax meaning.

In some embodiments, the live preview generator 420 may be triggered by the code editing tracker 410 after detecting an atomic function block has been received. The live preview generator 420 may sync the existing source code in the code editor 401 into an in-browser bundler with pre-loaded libraries. The in-browser builder may include a dependency graph indicating relationships between the source code and the pre-loaded libraries. Then the live preview generator 420 renders, using the in-browser bundler and based on the dependency graph, the preview of the widget, or compiled logic or code within the widget, based on the source code and libraries used by the source code. The rendering may include at least running a main entry point of the widget inside an iframe, an environment in which communication with other applications is restricted or limited. The live preview may be displayed and refreshed in the live preview 402 region in the IDE 400. In some embodiments, the live preview generator 420 may avoid re-generating the entire live view of the widget every time when an atomic function block is received. Instead, the live preview generator 420 may store the previously generated live preview as a snapshot, and only generate the component that is affected/added by the newly received atomic function block. The newly generated component may then be combined (e.g., adding to or replacing an existing component) into the snapshot as the new live preview.

In some examples, the live preview generator may generate different live previews according to different stacks, platforms, and/or ontologies. For example, running or compiling the code within the widget may result in outputting, displaying, or populating information regarding a person including one or more attributes of the person. For example, as illustrated in FIG. 4B, a live preview 412 may be according to a first ontology, in which a person object has a SSN (social security number) attribute, and the SSN is defined according to a specific format of dashes in between the numbers. Meanwhile, a live preview 422 may be according to a second ontology, in which a person object has a SSN attribute, and the SSN is defined according to a specific format of uninterrupted numbers without dashes. As another example, a live preview 432 may be according to a third ontology, in which a person object lacks an SSN attribute but has an address attribute instead.

The auto-testing pipeline 430 may be triggered by the developer before publishing the widget. Upon being triggered, the auto-testing pipeline 430 runs sanity check, integration tests, and other tests based on the pre-configured testing data. The testing data may include ontology data for testing purposes.

Figure 5:
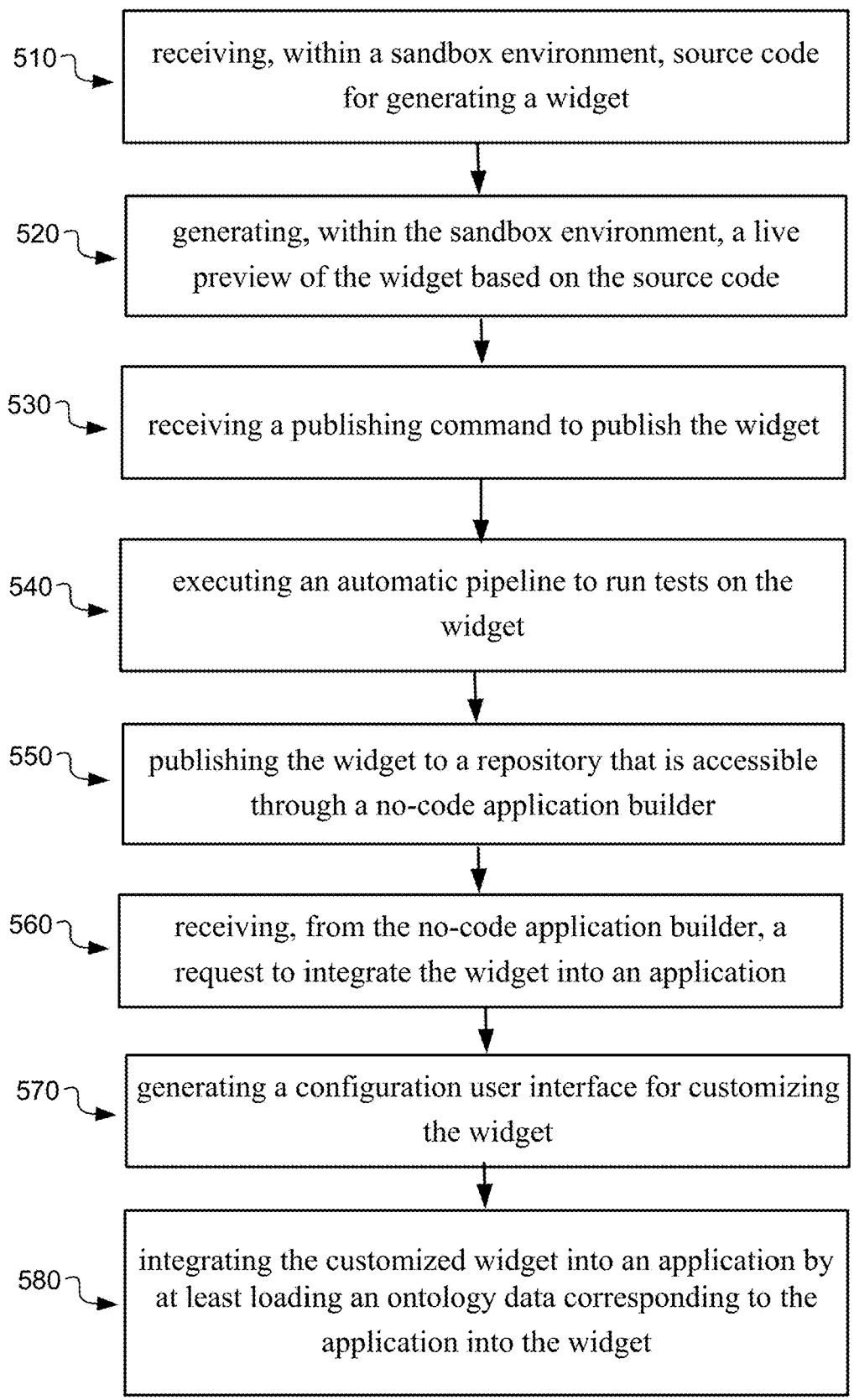
FIG. 5 illustrates a flowchart of an example method of managing third-party widgets for application development, in accordance with various embodiments of the present technology.

FIG. 5 illustrates a flowchart of an example method of managing third-party widgets for application development, in accordance with various embodiments of the present technology.

Step 510 of the method includes receiving, within a sandbox environment, source code for generating a widget.

Step 520 of the method includes generating, within the sandbox environment, a live preview of the widget based on the source code. In some embodiments, the generating the live preview of the widget based on the source code includes: syncing the source code into an in-browser bundler with pre-loaded libraries (e.g., the in-browser bundler may include a dependency graph indicating relationships between the source code and the pre-loaded libraries); and rendering, using the in-browser bundler, the preview of the widget based on the source code and libraries used by the source code. The rendering may include at least running a main entry point of the widget inside an iframe.

Step 530 of the method includes receiving a publishing command to publish the widget.

Step 540 of the method includes executing an automatic pipeline to run tests on the widget. In some embodiments, the executing the automatic pipeline may include: integrating the widget with one or more preexisting widgets, wherein the integrating comprises importing ontology data into the widget and the one or more preexisting widgets, wherein the integrating results in a creation of a test application; feeding input data into the test application; executing the test application to output data based on the input data; and receiving a verification of the test application.

Step 550 of the method includes publishing the widget to a repository that is accessible through a no-code application builder. In some embodiments, the publishing the widget to the repository may include: obtaining metadata of the widget; obtaining a list of repositories; for each of a plurality of repositories, determining whether metadata of the repository matches with the metadata of the widget; and in response to the metadata of the repository matching with the metadata of the widget, publishing the widget to the repository.

Step 560 of the method includes receiving, from the no-code application builder, a request to integrate the widget into an application.

Step 570 of the method includes generating a configuration user interface for customizing the widget.

Step 580 of the method includes integrating the customized widget into an application by at least loading an ontology data corresponding to the application into the widget Hardware Implementation The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 6:
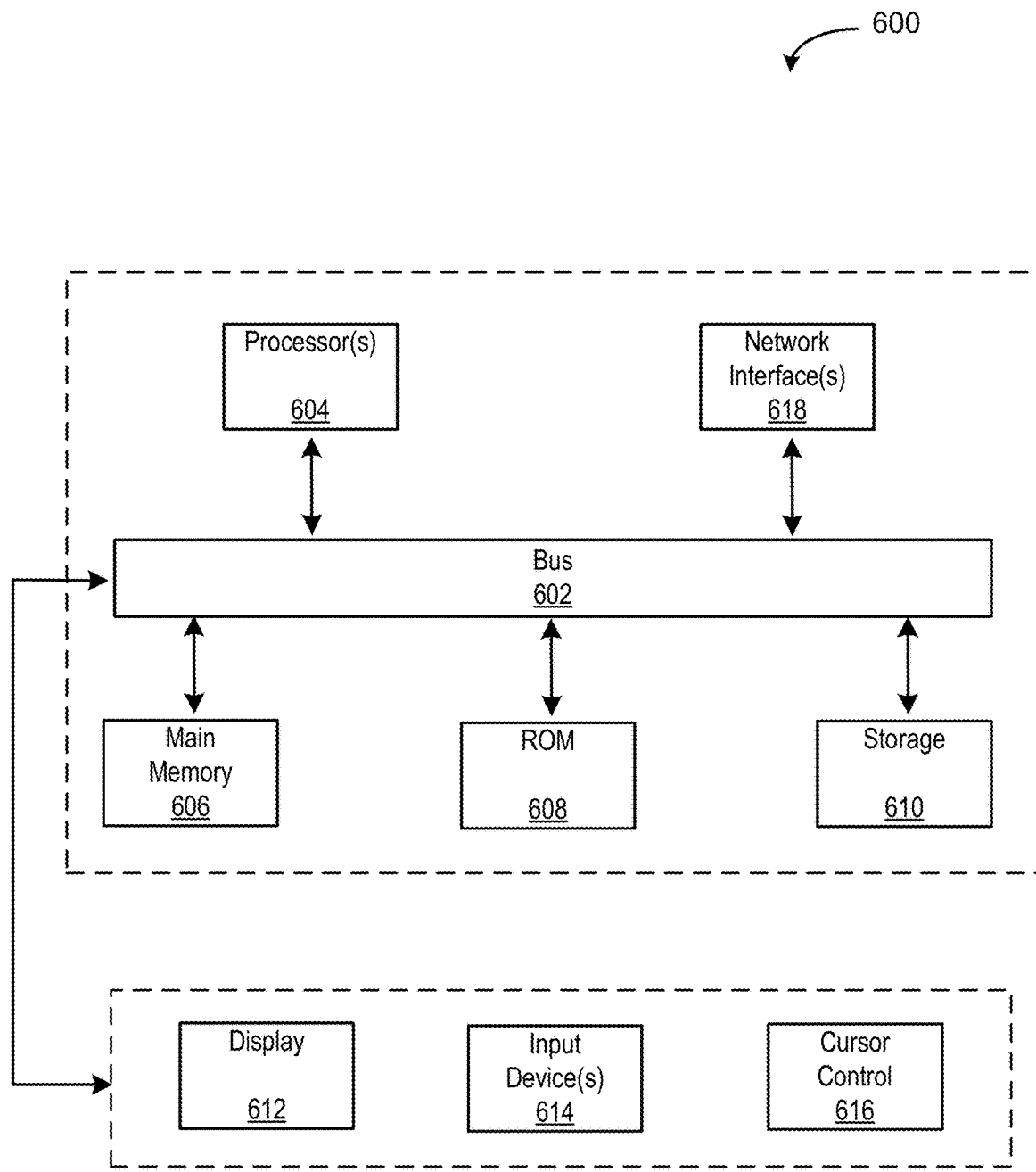
FIG. 6 illustrates a block diagram of an example computer system in which any of the embodiments described herein may be implemented.

FIG. 6 illustrates a block diagram of an example computer system in which any of the embodiments described herein may be implemented.

The computer system 600 also includes a main memory 606, such as a random-access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read-only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

The invention claimed is:

1. A system comprising:
one or more processors; and
a memory storing instructions that, when executed by the one or more processors, cause the system to perform, within a platform in a sandbox environment:
receiving, within the sandbox environment, source code for generating a widget;
syncing the source code into an in-browser bundler with libraries, wherein any relationships among the source code and the libraries are indicated by a dependency graph;
generating, within the sandbox environment, a live preview of the widget based on the source code or the libraries, wherein generating the live preview comprises rendering, using the in-browser bundler, the live preview of the widget based on the source code or the libraries, wherein the rendering of the live preview occurs within an iframe;
receiving a publishing command to publish the widget;
executing an automatic pipeline to run tests on the widget;
publishing the widget to a repository that is accessible through a no-code application builder;
receiving, from the no-code application builder, a request to integrate the widget into an application;
generating a configuration user interface for customizing the widget; and
integrating the customized widget into an application by at least loading an ontology data corresponding to the application into the widget.

2. The system of claim 1, wherein the platform further comprises a web browser, and
the source code and the publishing command are received by the web browser,
the live preview is displayed on the web browser, and
the configuration user interface for customizing the widget is displayed on the no-code application builder.

3. The system of claim 2, wherein the web browser comprises a first region for receiving the source code, and a second region for displaying the live preview of the widget.

4. The system of claim 1, wherein the system is associated with one or more machine learning components, and wherein to publish the widget to the repository, the instructions cause the system to further perform:
obtaining, using the one or more machine learning components, metadata of the widget;
obtaining a list of repositories;
for each of a plurality of repositories, determining whether metadata of the repository matches with the metadata of the widget; and in response to the metadata of the repository matching with the metadata of the widget, publishing the widget to the repository.

5. The system of claim 1, wherein the no-code application builder comprises a graphic user interface (GUI) to generate the request without writing code.

6. The system of claim 1, wherein to executing the automatic pipeline to run tests on the widget, the instructions cause the system to further perform:
integrating the widget with one or more preexisting widgets, wherein the integrating comprises importing ontology data corresponding to the platform into the widget and the one or more preexisting widgets, wherein the integrating results in a creation of a test application;
feeding input data into the test application;
executing the test application to output data based on the input data; and
receiving a verification of the test application.

7. The system of claim 6, wherein the widget and the one or more preexisting widgets are published under different categories.

8. The system of claim 1, wherein after generating the configuration user interface for customizing the widget, the instructions cause the system to further perform:
receiving an input from the configuration user interface that identifies the ontology data corresponding to the application.

9. The system of claim 1, wherein the configuration user interface for customizing the widget allows a user to configure a shape of the widget.

10. The system of claim 1, wherein the instructions cause the system to further perform:
receiving source code for generating a new version of the widget; and
publishing the new version of the widget to the repository that is accessible through the no-code application builder while keeping older versions of the widget.

11. The system of claim 10, wherein the instructions cause the system to further perform:
receiving, through the no-code application builder, a request to upgrade an already integrated version of the widget to the new version of the widget; and
integrating the new version of the widget into the application.

12. The system of claim 10, wherein the instructions cause the system to further perform:
receiving, through the no-code application builder, a request to downgrade an already integrated version of the widget to an older version of the widget; and
integrating the older version of the widget into the application.

13. The system of claim 1, wherein to generate the live preview of the widget based on the source code, the instructions cause the system to further perform:
performing live code syntax analysis while the source code is being received; and
in response to detecting that an atomic section of the source code is received based on the live code syntax analysis, updating, in real-time, a rendering of the live preview by incorporating features implemented by the atomic section of the source code.

14. A computer-implemented method, comprising:
receiving, within a sandbox environment, source code for generating a widget;
syncing the source code into an in-browser bundler with libraries, wherein any relationships among the source code and the libraries are indicated by a dependency graph;
generating, within the sandbox environment, a live preview of the widget based on the source code or the libraries, wherein generating the live preview comprises rendering, using the in-browser bundler, the live preview of the widget based on the source code or the libraries, wherein the rendering of the live preview occurs within an iframe;
receiving a publishing command to publish the widget;
executing an automatic pipeline to run tests on the widget;
publishing the widget to a repository that is accessible through a no-code application builder;
receiving, from the no-code application builder, a request to integrate the widget into an application;
generating a configuration user interface for customizing the widget; and
integrating the customized widget into an application by at least loading an ontology data corresponding to the application into the widget.

15. The method of claim 14, wherein the publishing the widget to the repository comprises:
obtaining metadata of the widget;
obtaining a list of repositories;
for each of a plurality of repositories, determining whether metadata of the repository matches with the metadata of the widget; and
in response to the metadata of the repository matching with the metadata of the widget, publishing the widget to the repository.

16. The method of claim 14, wherein the executing the automatic pipeline comprises:
integrating the widget with one or more preexisting widgets, wherein the integrating comprises importing ontology data into the widget and the one or more preexisting widgets, wherein the integrating results in a creation of a test application;
feeding input data into the test application;
executing the test application to output data based on the input data; and
receiving a verification of the test application.

17. The method of claim 14, wherein the generating the live preview of the widget comprises:
performing live code syntax analysis while the source code is being received; and
in response to detecting that an atomic section of the source code is received based on the live code syntax analysis, updating, in real-time, a rendering of the live preview by incorporating features implemented by the atomic section of the source code.

18. A non-transitory computer-readable storage medium configured with instructions executable by one or more processors to cause the one or more processors to perform operations comprising:
receiving, within a sandbox environment, source code for generating a widget;
syncing the source code into an in-browser bundler with libraries, wherein any relationships among the source code and the libraries are indicated by a dependency graph;
generating, within the sandbox environment, a live preview of the widget based on the source code or the libraries, wherein generating the live preview comprises rendering, using the in-browser bundler, a live preview of the widget based on the source code or the libraries, wherein the rendering of the live preview occurs within an iframe;

receiving a publishing command to publish the widget;

executing an automatic pipeline to run tests on the widget;

publishing the widget to a repository that is accessible through a no-code application builder;

receiving, from the no-code application builder, a request to integrate the widget into an application;

generating a configuration user interface for customizing the widget; and integrating the customized widget into an application by at least loading an ontology data corresponding to the application into the widget.

\* \* \* \* \*